United States Patent [19]
Williams

[11] Patent Number: 5,320,322
[45] Date of Patent: Jun. 14, 1994

[54] BANNER BRACKET

[76] Inventor: Jeffrey Z. Williams, 320 E. Adams St., St. Louis, Mo. 63122

[21] Appl. No.: 107,930

[22] Filed: Aug. 17, 1993

[51] Int. Cl.⁵ ............................................. F16M 13/00
[52] U.S. Cl. ..................................... 248/514; 116/173; 248/291
[58] Field of Search ............... 248/511, 514, 519, 520, 248/524, 523, 286, 291; 116/173; 403/310, 92; 40/607

[56] References Cited

U.S. PATENT DOCUMENTS

| | | | |
|---|---|---|---|
| 581,991 | 5/1897 | Homan | 248/291 X |
| 1,286,541 | 12/1918 | Cook | |
| 1,339,833 | 5/1920 | Saltmarsh | |
| 1,525,515 | 2/1925 | Socha | |
| 2,733,030 | 1/1956 | Hawthorne | |
| 3,162,407 | 12/1964 | Yax | 248/514 |
| 3,263,356 | 8/1966 | Gilmoure | |
| 3,599,599 | 8/1971 | Jones | |
| 3,786,778 | 1/1974 | Palmer | 116/173 |
| 3,850,401 | 11/1974 | Snediker | |
| 4,140,296 | 2/1979 | Guillen | 248/286 X |
| 4,482,122 | 11/1984 | Grashow | 248/514 |
| 4,720,074 | 1/1988 | Gard | 403/310 X |
| 4,864,962 | 9/1989 | Kuehl | |
| 4,880,195 | 11/1989 | Lepley | |
| 4,905,946 | 3/1990 | Lai | 403/92 |
| 5,026,028 | 6/1991 | Ooi | 403/161 X |
| 5,029,799 | 7/1991 | Bernier | 248/533 X |
| 5,069,416 | 12/1991 | Ennis | 248/291 X |

FOREIGN PATENT DOCUMENTS 239159 1/1961 Australia ............................ 248/514

Primary Examiner—J. Franklin Foss
Attorney, Agent, or Firm—Lawrence E. Evans, Jr.; Bruce J. Bowman

[57] ABSTRACT

A banner support bracket includes a plate-like member having a slightly concave rear surface to conform to a support post during mounting, and two spaced-apart upstanding walls defining a channel therebetween. A rod holder assembly is disposed within the channel and removably retains a banner rod through engagement with a cotter pin. The rod holder assembly is vertically movable along the length of the channel as well as variably tiltable through an angle of 180° from the vertical axis of movement. The ability of the rod holder assembly, and thus the support rod, to assume variable angles permits a wide variety of banner configurations to be supported. Two such banner bracket supports are mounted to a standard in order to hold the longitudinal ends of the banner taut regardless of the angle of cut of the banner ends. A slight cantilever built in to the rod holder assembly helps keep the banner taut.

14 Claims, 4 Drawing Sheets

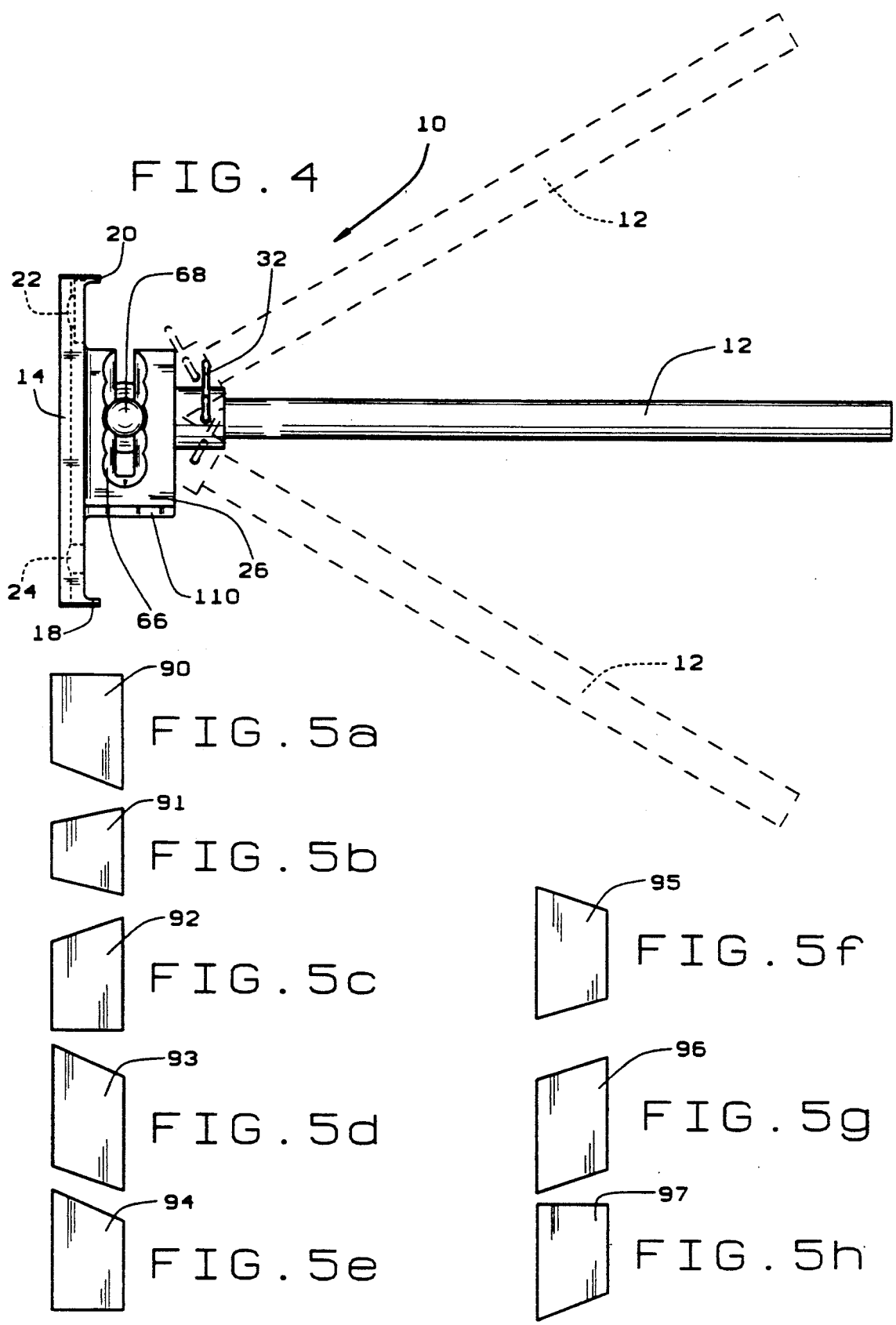

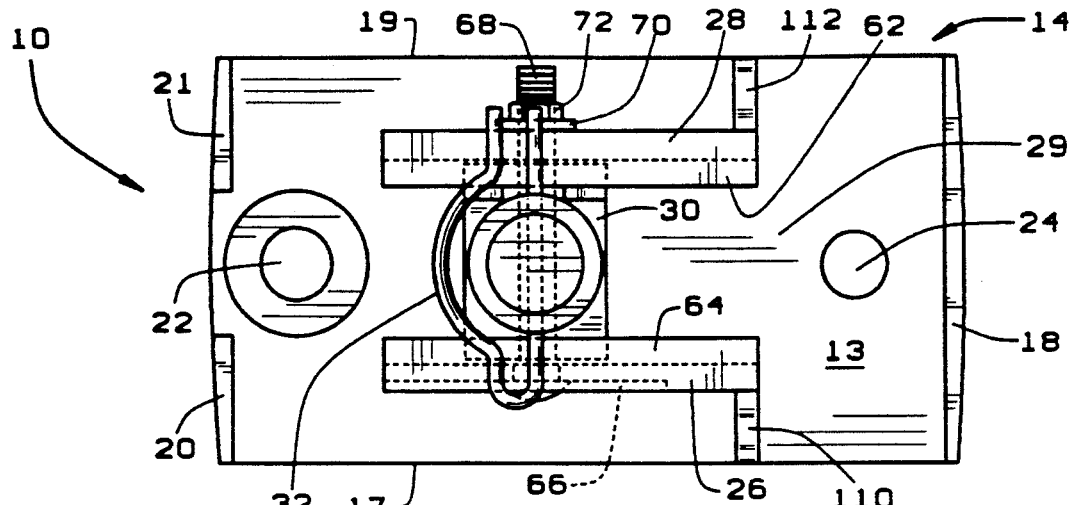
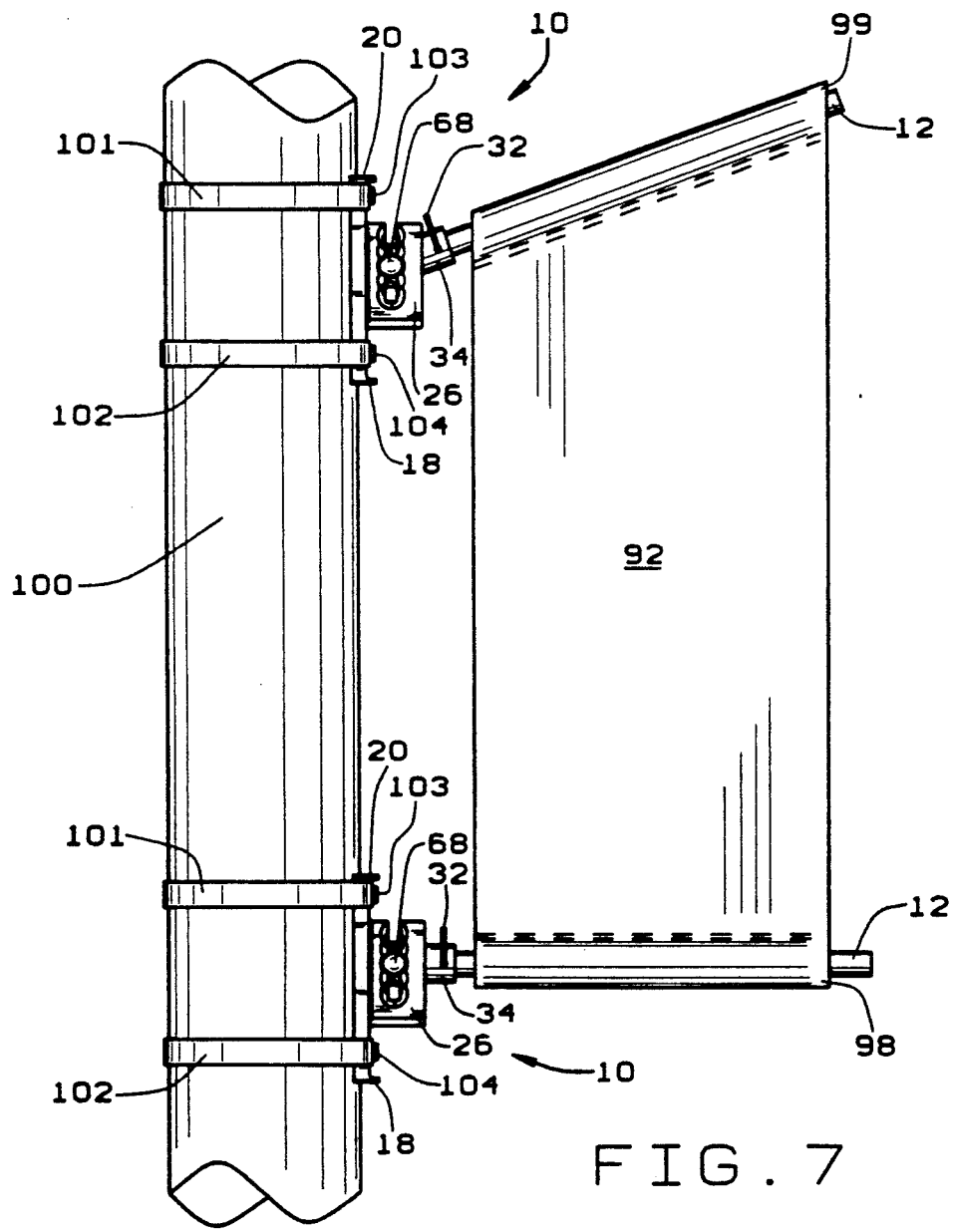

BANNER BRACKET

FIELD OF THE INVENTION

The present invention relates generally to banner support assemblies and, more particularly, to a banner support bracket for holding a banner taut via a banner rod.

BACKGROUND OF THE INVENTION

Banners are used by many organizations and municipalities to advertise various events or as general decorations throughout the year and during festivals or the like. The banners are generally supported from light poles, standards, or other similar structures by brackets with integral rods wherein the banner may be easily seen but still be out of reach of the public.

Because of the nature of banners, as opposed to flags, it is necessary to hold both longitudinal ends of the banner such that the banner is kept taut. Usually, each end of the banner includes a pocket or similar elongated opening therein into which is received a support rod. The pocket and rod generally extend the entire length of the banner at the particular longitudinal end of the banner.

Heretofore, various brackets have been developed for holding banners taut. Of these, some brackets have been developed to specifically address and withstand the various wind loads that banners are subjected to due to the fact that they are held taut like a sail and cannot flap and wave to release the wind energy, in contrast to a flag. Other banner brackets have been designed to maintain the banner taut by incorporating a fixed angle into a fixed rod holder.

However, the prior art banner brackets are only capable of supporting banners that are essentially rectangular in shape. The banners therefore have longitudinal ends that are essentially perpendicular to the post onto which the bracket is mounted. Thus, such prior art banner brackets will support only one banner configuration, i.e. the rectangular banner, whereas there are many other possible and more appealing configurations.

Furthermore, such prior art banner brackets that are vertically adjustable are cumbersome to vertically adjust in situations where there is a change in the longitudinal length of the banner, either through stretching of the banner during use or actual change thereof.

In view of the shortcomings of the prior art, it is thus an object of the present invention to provide a banner support bracket that is capable of supporting a variety of banner configurations.

It is further an object of the present invention to provide a banner support bracket that is easily vertically adjustable due to stretching of the banner during use, or in situations where the longitudinal dimension of the banner has changed.

SUMMARY OF THE INVENTION

Accordingly, the present invention provides a banner support bracket for holding any size of a banner mounting rod having a rod holder assembly that is easily longitudinally or vertically adjustable as well as incrementally angularly adjustable through a 180° angle defined from the vertical axis of movement of the rod holder assembly.

The present bracket is for supporting an end of a banner having a banner support rod. The banner bracket comprises, a base plate, a first wall disposed on an upper surface of the base plate and positioned essentially perpendicular thereto, the first wall having an elongated slot therethrough. A second wall is disposed on an upper surface of the base plate and positioned essentially perpendicular thereto, the second wall is in spaced relationship to the first wall thereby defining a channel therebetween, the second wall having an elongated slot therethrough, The bracket further provides a rod holder assembly disposed within the channel and adapted to removably retain a banner rod for supporting an end of a banner, the rod holder assembly including a bore therethrough. The rod holder assembly is selectively adjustably movable along the channel to vertically set the height thereof, and selectively securable against vertical movement by a bolt and nut extending through the first wall elongated channel, the rod holder bore, and the second wall elongated channel. The rod holder assembly is selectively angularly adjustable about a 180° arc of movement defined from an axis coaxial with the vertical plane of movement of the rod holder assembly.

Further, the present invention provides a bracket assembly for holding a first and second banner support rod to support and maintain a banner taut, one support rod is for retaining one end of the banner with the second support rod is for retaining the other end of the banner. The bracket assembly comprises a first and second bracket each having an elongated plate-like portion with the following common components. A first wall is disposed on an upper surface of the plate-like portion and positioned essentially perpendicular thereto, the first wall has an elongated recess on an inner surface thereof and an elongated slot therethrough. A second wall is disposed on an upper surface of the plate-like portion and positioned essentially perpendicular thereto, the second wall is in spaced relationship to the first wall and includes an elongated recess on an inner surface thereof thereby defining a slotted channel between the first and second wall, the second wall having an elongated slot therethrough. A rod holder assembly is further disposed within and retained by the channel and adapted to removably hold a banner rod for supporting an end of a banner. The rod holder assembly includes a bore therethrough, and is selectively adjustably movable along the channel to vertically set the height thereof, and selectively securable against vertical movement by a bolt and nut extending through the first wall elongated channel, the rod holder bore, and the second wall elongated channel. The rod holder assembly is selectively angularly adjustable about a 180° arc of movement defined from an axis coaxial with the vertical plane of movement of the rod holder assembly.

BRIEF DESCRIPTION OF THE DRAWINGS

So that the manner in which the above-recited features, advantages, and objects of the present invention are attained and can be understood in detail, a more particular description of the invention, briefly summarized above, may be had by reference to the embodiments thereof which are illustrated in the appended drawings.

It is noted, however, that the appended drawings illustrate only typical embodiments of this invention and is therefore not to be considered limiting of its scope, for the invention may admit to other equally effective embodiments. Reference the appended drawings, wherein:

FIG. 4 is a side view of the present banner bracket with a banner support rod therein depicting several of the various rod orientations achievable in accordance with the present invention;

FIGS. 5a-h are diagrammatic representations of various banner configurations supportable by a pair of banner brackets in accordance with the present invention;

FIG. 6 is a top plan view of the present banner bracket; and

FIG. 7 is an elevational view of a pair of banner brackets attached to a standard supporting the banner of FIG. 5c.

DETAILED DESCRIPTION

Figure 1:
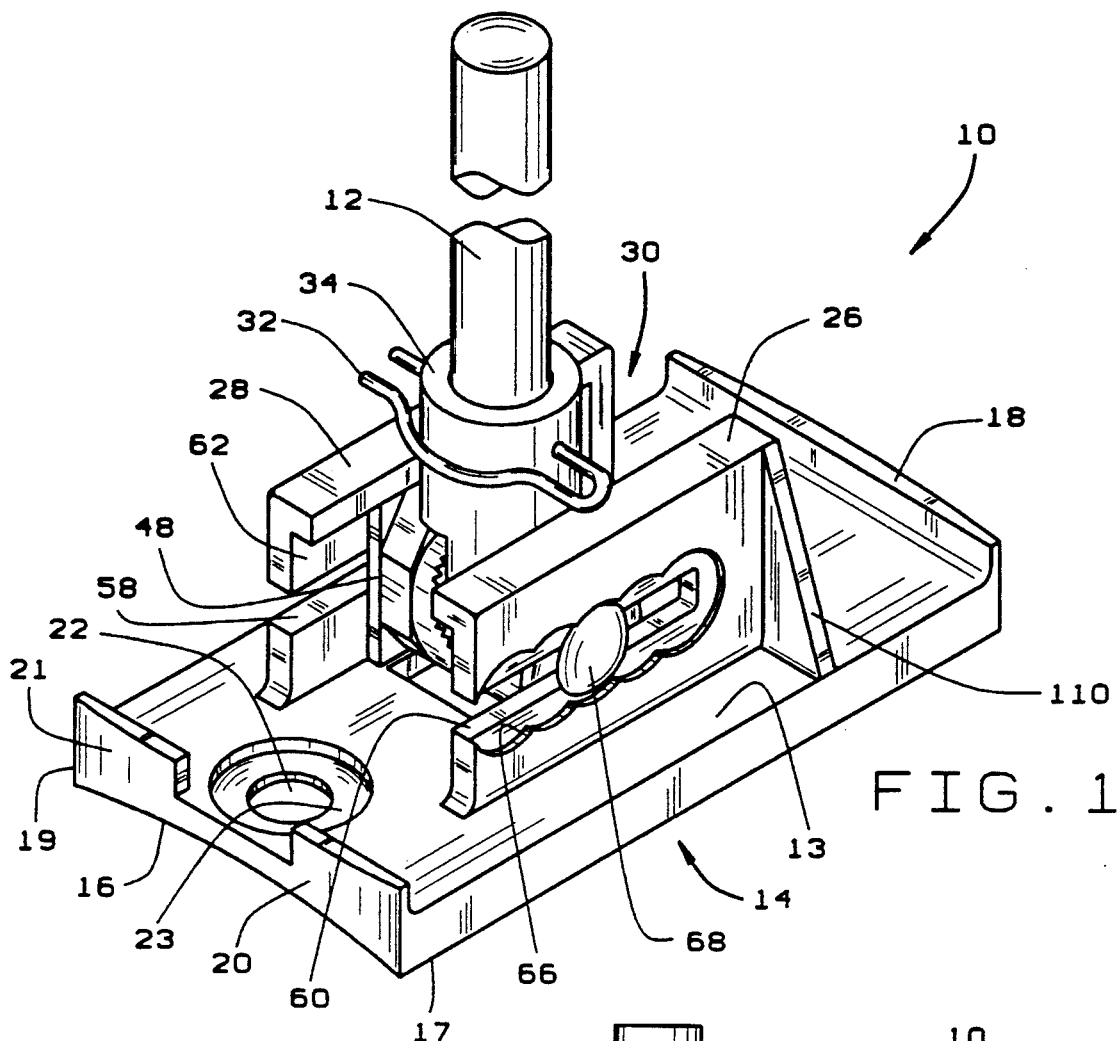
FIG. 1 is a perspective view of the present banner bracket with a banner support rod therein.
Figure 2:
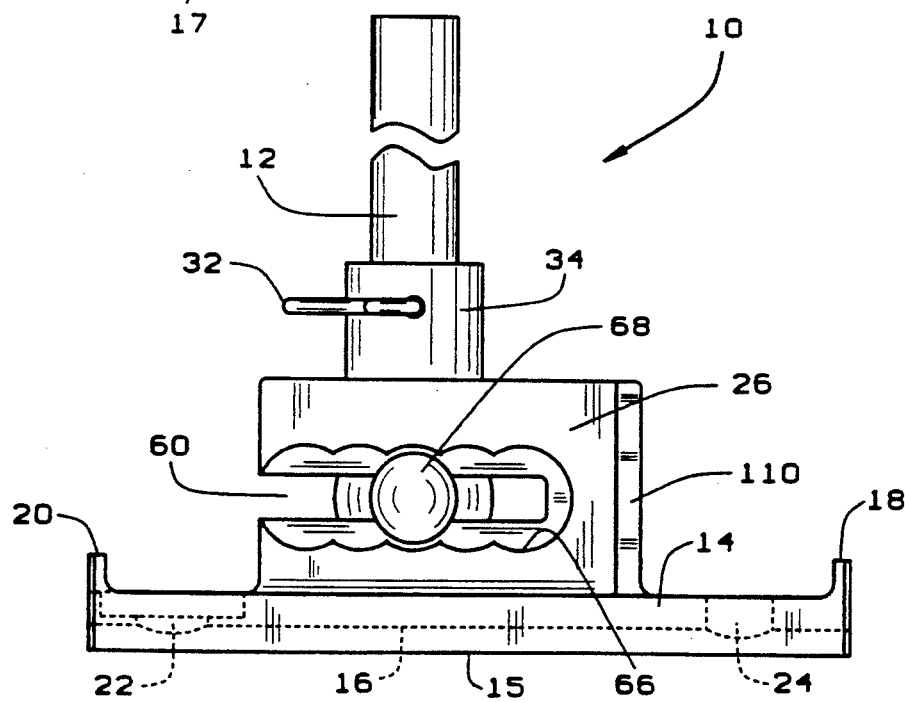
FIG. 2 is a side elevational view of the present banner bracket of FIG. 1.

Referring now to FIGS. 1 and 2, there is shown a banner bracket generally designated 10 depicted supporting a banner support rod 12 in accordance with the present invention. Banner bracket 10 includes a plate-like member or base 14 defining an upper surface 13 and a lower surface 15. Lower surface 15 has a concave portion 16 that extends along the entire longitudinal length of base 14. Concave portion 16 defines a rate of curvature or arc from one edge 17 of base 14 to the other edge 19 of base 14 in order to conform to and facilitate the mounting thereof onto a street light pole, standard, or the like.

Disposed on one short end of base 14 and extending the entire length thereof is an elongated flange 18 that is essentially perpendicular to base 14. Disposed on the other short end of base 14 diametrically opposite flange 18 are two flanges 20, 21 that each extend essentially one-third of the length of the side. Flange 18 provides a positive stop at one end of base 14 for locating a strap or band when mounting banner bracket 10. Likewise, flanges 20, 21 provide a positive stop at one end of base 14 for locating a second strap or band when mounting banner bracket 10 onto a post. A first bore 22 and recess 23 are provided in base 14 on the end adjacent flanges 20, 21 through which is received a bolt 103 (see FIG. 7) for mounting banner bracket 10 onto a post. A second bore 24 is provided in base 14 on the end adjacent flange 18 through which is received a bolt 104 (see FIG. 7) for mounting banner bracket 10 onto a post.

Referring additionally to FIG. 6, integrally formed with base 14 are two upstanding walls 26, 28 spaced apart a given distance and defining a channel 29 in which a rod holder assembly 30 slides back and forth. When mounted on a post, rod holder assembly 30 slides vertically relative to the ground. Regardless of the mounting position of banner bracket, the term "vertical" as used herein is defined as the direction of back and forth travel of rod holder assembly 30 within channel 29. As can be seen in FIG. 6, walls 26, 28 are located a distance inwardly from each respective end 17, 19 and longitudinally extend about half the distance of base 14, disposed essentially in the middle thereof. Wall 26 includes an angle brace 110 for providing extra wind support, while wall 28 includes an angle brace 112 also for providing extra wind support. Wall 28 includes an elongated opening 58, while wall 26 includes a similar elongated opening 60. Each wall 26, 28 further includes a respective rectangular slot 60, 62 each defining a channel on the inside thereof such that slots 60, 62 are opposed and thus face each other. Rod holder assembly 30 is movably retained within slots 60, 62 such that rod holder assembly 30 may slide or adjust longitudinally along channel 29. Slots 60, 62 are open on one end to allow rod holder assembly 30 to be removed therefrom to change the angle of banner rod 12 as explained hereinbelow, but includes stops, of which only one stop 76 of wall 28 is shown, on the other end to prevent rod holder assembly 30 from exiting therefrom.

Figure 3:
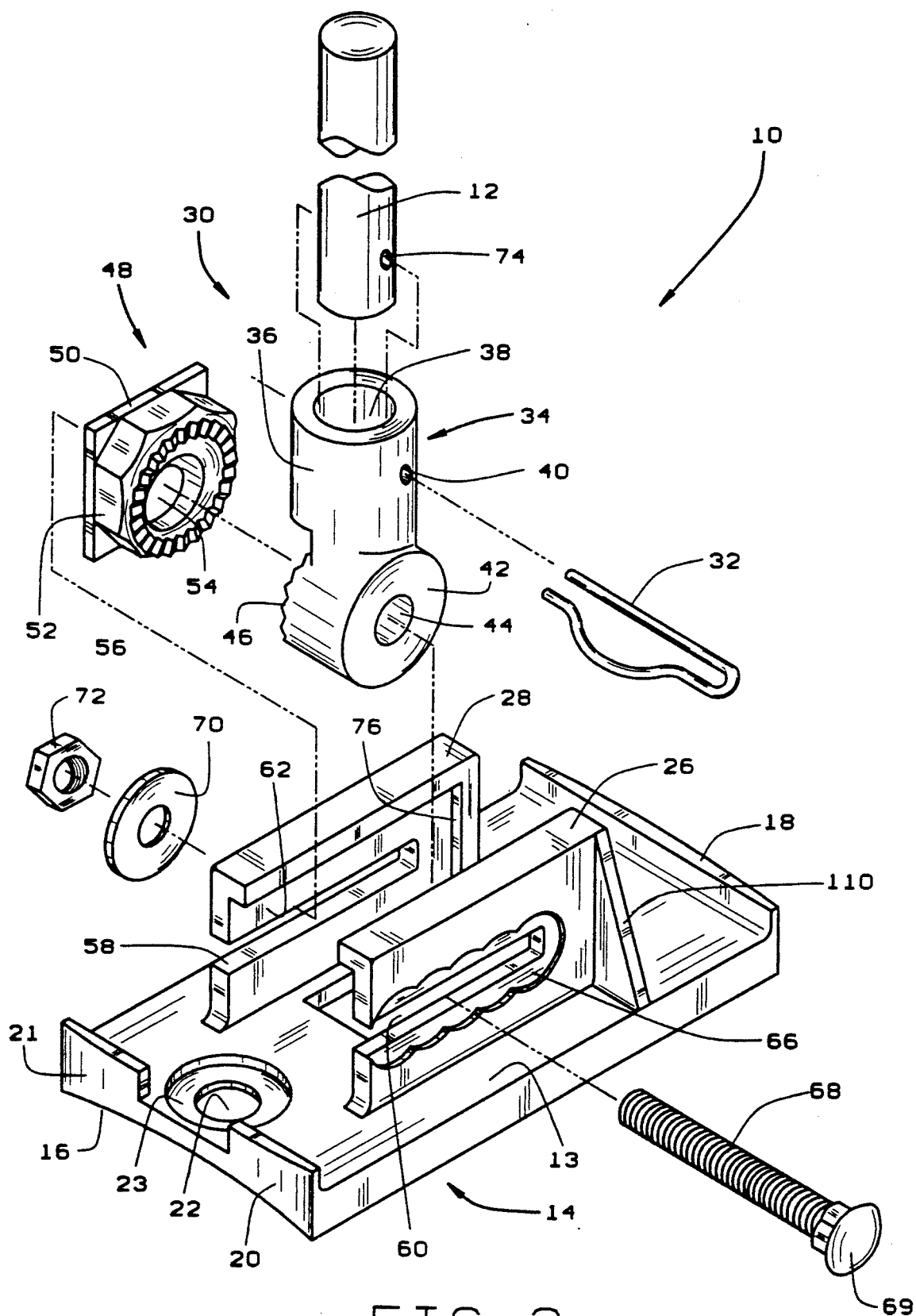
FIG. 3 is an exploded view of the present banner bracket.

With reference to FIG. 3, there is shown an exploded view of the present banner bracket depicting the constituent parts of the rod holder assembly 30. Rod holder assembly 30 includes a swivel member 34 having a first cylindrical portion 36 with a cylindrical bore 38 in which is received the banner support rod 12. Banner support rod 12 thus slidingly fits into cylindrical rod bore 38 and is removably retained therein by a cotter pin 32. A bore 40 through first cylindrical portion 36 aligns with a bore 74 in banner rod 12 when banner rod 12 is properly inserted in cylindrical rod bore 38. Cotter pin 32 thus extends through bores 40 and 74 to retain banner support rod such that as rod holder assembly 30 moves, banner support rod 12 must move therewith.

Swivel member 34 further includes a second cylindrical portion 42 having a bolt bore 44 therethrough. Bolt bore 44 in second cylindrical portion 42 defines an axis that is essentially perpendicular to an axis defined by cylindrical rod bore 38. On one end of second cylindrical portion 42 is an annular set of teeth or ratchet 46. Rod holder assembly 30 also includes a sliding member 48 having a square back plate 50 and a nut shaped front 52. A bolt bore 54 extends therethrough and is coaxial with bolt bore 44. On the outside surface of nut shaped front 52 is a similar annular set of teeth or ratchet 56. Annular teeth 56 of sliding member 48 mate with annular teeth 46 of second cylindrical portion 42 when swivel member 34 and sliding member 48 are joined to form rod holder assembly 30. A bolt 68 transversely extends through elongated opening 60 of wall 26, through bolt bore 44 of second cylindrical portion 42, bolt bore 54 of sliding portion 48, and elongated opening 58 of wall 28. A washer 70 and nut 72 secures the threaded end of bolt 68. In this manner, rod holder assembly 30 is releasably secured along its travel path within channel 29. It should be noted that wall 26 includes on the outside surface an elongated groove 66 defining a plurality of bolt head recesses that define incremental steps along the travel path of rod holder assembly 30 into which rod holder assembly 30 may be secured.

FIG. 4 depicts several banner rod 12 orientations that are achievable in accordance with the present invention. Banner rod 12, shown in solid, is set at an angle of 90° relative to the vertical, or an axis defined by the longitudinal, or vertical, travel path of rod holder assembly 30 within channel 29. The phantom lines depict essentially 45° and 135° angles relative the vertical. The various angles are set by rotating swivel portion 34 relative sliding portion 48 and then placing rod holder assembly 30 into channel 29. At this point, rod holder assembly 30 is restrained from angle change since the width of channel 29 defined by walls 26, 28, is only slightly greater than the total width of second cylindrical portion 42 and sliding member 48 when adjoining. This then prevents angle change once being set and placed within channel 29. Bolt 68 along with washer 70 and nut 72 set the placement of rod holder assembly 30 along the travel path, as bolt head 69 of bolt 68 abuts the respective bolt recess of elongated groove 66.

Swivel portion 34 is rotatable in 15° increments relative to sliding portion 48 and the axis of the travel path of rod holder assembly 30 such that banner support rod 12 may be set at angles anywhere from 0° to 180° in the 15° increments. It should be appreciated that the size and spacing of the two sets of annular teeth 46, 56, defines the angle increments, and thus it would be known to one skilled in the art to change the degree increments by changing the teeth size and spacing for finer angle increments or greater angle increments.

Because of the nature of the annular teeth 46 and 56 of rod holder assembly 30, there is introduced a slight cantilever since although a 90° angle for banner support rod 12 would be achievable due to the 15° increments, the rod holder assembly 30 does not start out at exactly 0°. Thus, the 90° setting is either slightly less than 90° or more than 90°, depending on which longitudinal end of the banner is being supported. Likewise each angular setting would be slightly off of the "true" degree angle. This, however, helps maintain the banner taut.

Referring now to FIGS. 5a-h, there are depicted various configurations of banners supportable by a pair of spaced apart banner brackets as more fully described hereinbelow under the heading "Operation." Because rod holder assembly 30 is adjustably tiltable through an angle of 180° from the vertical, each banner bracket 10 can hold taut a banner having angled longitudinal ends as well as straight longitudinal ends, or a combination thereof. It should be here appreciated that two pairs of banner brackets 10 may be utilized to hold two banners with one pair of brackets holding one banner adjacent another banner held by the other pair of brackets. In this manner, various styles of display banners may be achieved.

FIG. 5a depicts a banner 90 having a top longitudinal end is cut perpendicular to the vertical or at an angle of 90°, with a bottom longitudinal end cut at an angle of approximately 135° degrees. Thus, in the case of the support of banner 90 depicted in FIG. 5a, the upper banner bracket rod holder would be set at 90°, while the lower banner bracket rod holder would be set at approximately 135°. It should be here appreciated that due to the orientation of the incremental ratchet of the rod holder as described hereinabove, a slight cantilever is introduced to maintain the banner taut. FIG. 5b depicts a banner 91 having a top longitudinal end that is cut at an angle of approximately 45° from the vertical axis, while the bottom longitudinal end is cut at an angle of approximately 135°. Thus, the pair of banner bracket rod holders would be set accordingly. FIG. 5c depicts another banner 92 having a top longitudinal end that is cut at an angle of approximately 45°, with a bottom longitudinal end cut at an angle of approximately 90°. In FIG. 5d, a banner 93 has a top longitudinal end cut at an angle of approximately 135°, while the bottom longitudinal end is also cut at an angle of approximately 135°. A further banner 94 is depicted in FIG. 5e having a top longitudinal end cut at an angle of approximately 135°, with a bottom longitudinal end cut at an angle of approximately 90°. FIG. 5f depicts a banner 95 having a top longitudinal end cut at approximately 135°, with a bottom end cut at an angle of approximately 45°. A yet further banner 96 is depicted in FIG. 5g. Banner 96 has a top longitudinal end cut at approximately 45°, with a bottom end cut at an angle of approximately 45°. Lastly, FIG. 5h depicts a banner 97 having a top longitudinal end cut at approximately 90°, with a bottom end cut at an angle of approximately 45°. It should be noted that these shapes are only illustrative of some of the many banner configurations that may be held by the present banner brackets, and is not intended to be an all inclusive, limiting, or exhaustive list.

In a preferred form, base 14 along with integral upstanding lateral walls 26, 28, and rod support assembly 30 are all cast from aluminum, here Almag 35 aluminum ingot, but other non-rusting metals and fabrication techniques may be utilized as is known to one skilled in the art. Furthermore, rod 12 is fabricated from fiberglass, but may be aluminum or other any other material which provides adequate support and relative flexibility in order to flex under winds loads as explained hereinabove. Dimensionally, rectangular base 14 is 3½" by 7½", while the rod holder assembly 30 enjoys a total travel path distance of 2¼". Rod 12 has an 11/16" diameter and a length of 32½", with an engagement diameter of 15/16" for receipt into the rod holder assembly.

OPERATION

Referring now to FIG. 7, the manner in which the present banner brackets are mounted and adjusted for various banner configurations is presented. Generally, the banner brackets are mounted on a street lamp post or similar pole structure. In FIG. 7, a pair of identical banner brackets 10 are shown mounted to a post or standard 100 in spaced relationship according to the longitudinal size and cut of the banner to be supported. Brackets 10 are shown mounted to post 100 via bolts 103, 104 as well as strapped thereto via metal straps or bands 101, 102. It should be noted that it is generally not necessary to have both bolts and straps, as either one or the other may be used, however, for illustrative purposes both mounting methods are depicted, as some applications may indeed require or suggest the use of both methods. Flanges 19, 20, 21 help retain straps 101, 102 about upper surface 13 of base 14 such that straps 101, 102 do not slide off of the bracket.

Then, depending on the angle of cut of the ends of the banner, here banner 92 (FIG. 5c) is depicted, the angle of rods 12 are set by setting the corresponding angle of the respective rod holder. This is accomplished while rod holder assembly 30 is outside of channel 29 since even when bolt 68 is completely loosened or not in place at all, the angle of rod holder assembly 30 cannot be changed when disposed within channel 29.

Once the desired angle of each rod holder assembly 30 is set, the rod holder assembly is placed in the respective channel 29. The desired vertical placement of each rod holder assembly 30 is selected, which can be the same for both banner brackets 10 or may be different, depending on the placement of the banner brackets, and other factors such as stretching of the banner and the like. At this point, bolt 68 is inserted through wall 26, bores 44, 54, and wall 28. Nut 72 and washer 70 are placed on the threaded end of bolt 68 protruding from wall 28 and tightened. This sets the vertical distance.

Banner support rod 12 may already by in place within rod holder assembly 30 while adjustment is taking place, however, for ease of adjustment, it is preferable to insert banner support rod 12 after angular and vertical setting. One of the banner support rods 12 is inserted into the top pocket or sleeve 99 of banner 92, while the other of the banner support rods 12 is inserted into the bottom pocket or sleeve 98 of banner 92. Each banner support rod is placed in the respective rod holder assembly 12 and retained therein by the respective cotter pin 32. FIG. 6 shows a top view of the banner bracket 10 with the cotter pin 32 inserted therethrough.

Thus, once the desired angle for the banner is selected and set, any stretching of the banner or the like, may be easily countered by loosening nut 72 and sliding rod holder assembly 30 up, in the case of the upper banner bracket, and/or down, in the case of the lower banner bracket.

It can thus be appreciated that a change in length of the banner due to various factors can be easily accommodated for by vertical adjustment of a single bolt. Angular changes are likewise easily adjusted. Furthermore, a change in banners requires that only a cotter pin be removed to extricate the support rod from the rod holder, while a single bolt is loosened to change the length.

While the foregoing is directed to the preferred embodiment of the present invention, other and further embodiments of the invention may be devised without departing from the basic scope thereof, and the scope thereof is determined by the claims which follow.

What is claimed is:

1. A banner bracket for supporting an end of a banner with a banner support rod, the banner bracket comprising:
    a base plate;
    a first wall disposed on an upper surface of said base plate and positioned essentially perpendicular thereto, said first wall having an elongated slot therethrough;
    a second wall disposed on an upper surface of said base plate and positioned essentially perpendicular thereto, said second wall in spaced relationship to said first wall thereby defining a channel therebetween, said second wall having an elongated slot therethrough; and
    a rod holder assembly disposed within said channel and adapted to removably retain a banner rod for supporting an end of a banner, said rod holder assembly including a bore therethrough, said rod holder assembly selectively adjustably movable along said channel to vertically set the height thereof, and selectively securable against vertical movement by a shaft extending through said first wall elongated slot said rod holder bore and said second wall elongated slot, said rod holder assembly being selectively angularly adjustable about a 180° arc of movement defined from an axis coaxial with the vertical plane of movement of said rod holder assembly.

2. The banner bracket of claim 1, wherein said rod holder assembly is selectively securable against vertical movement by a bolt and nut extending through said first wall elongated channel.

3. The banner bracket of claim 1, wherein said base plate includes a longitudinally extending concavity on a lower surface thereof to conform to a mounting post.

4. The banner bracket of claim 1, wherein said banner rod is removably retained in said rod holder by a cotter pin.

5. The banner bracket of claim 4, wherein said banner rod is fiberglass, said fiberglass banner rod flexible under wind loads in order to deflect force from a mounting pole.

6. The banner bracket of claim 1, wherein said rod holder assembly is angularly adjustable in 15° increments.

7. The banner bracket of claim 1, wherein said rod holder assembly is cantilevered in order to maintain the banner taut.

8. The banner bracket of claim 1, wherein said rod holder assembly comprises:
    a first portion defining a cylindrical opening for receiving said banner rod therein, said cylindrical opening disposed perpendicular to said bore, said first portion including a first set of annular teeth having an axis coaxial with said bore; and
    a second portion having a second set of annular teeth with an axis coaxial with said bore, said second set of annular teeth adapted to engage said first set of annular teeth to set the incremental angle of said banner rod.

9. The banner bracket of claim 1, wherein said first wall includes a bolt recess on an outer surface thereof for retaining a head of said bolt in discrete positions along the vertical path of travel of said rod holder assembly.

10. A bracket assembly for holding a first and second banner support rod to support and maintain a banner taut, the first banner support rod retaining one end of the banner with the second banner support rod retaining the other end of the banner, the bracket assembly comprising:
    a first and second bracket each having an elongated plate-like portion, said first and second bracket each including:
    a first wall disposed on an upper surface of said plate-like portion and positioned essentially perpendicular thereto, said first wall having an elongated recess on an inner surface thereof and an elongated slot therethrough;
    a second wall disposed on an upper surface of said plate-like portion and positioned essentially perpendicular thereto, said second wall in spaced relationship to said first wall and including an elongated recess on an inner surface thereof thereby defining a slotted channel between said first and second wall, said second wall having an elongated slot therethrough; and
    a rod holder assembly disposed within and retained by said channel and adapted to removably hold a banner rod for supporting an end of a banner, said rod holder assembly including a bore therethrough, said rod holder assembly selectively adjustably movable along said channel to vertically set the height thereof, and selectively securable against vertical movement by a bolt and nut, the bolt extending through said first wall elongated slot said rod holder bore and said second wall elongated slot, said rod holder assembly being selectively angularly adjustable about a 180° arc of movement defined from an axis coaxial with the vertical plane of movement of said rod holder assembly.

11. The banner bracket assembly of claim 10, wherein each said plate-like portion includes a longitudinally extending concavity on a lower surface thereof to conform to a mounting post.

12. The banner bracket assembly of claim 10, wherein each said banner rod is removably retained in said respective rod holder by a cotter pin.

13. The banner bracket assembly of claim 10, wherein each said rod holder assembly is angularly adjustable in 15° increments.

14. The banner bracket assembly of claim 10, wherein each said rod holder assembly comprises:
 a first portion defining a cylindrical opening for receiving said banner rod therein, said cylindrical opening disposed perpendicular to said bore, said first portion including a first set of annular teeth having an axis coaxial with said bore; and
 a second portion having a second set of annular teeth with an axis coaxial with said bore, said second set of annular teeth adapted to engage said first set of annular teeth to set the incremental angle of said banner rod.

* * * * *